(No Model.)

A. J. HANKS.
VEHICLE WHEEL.

No. 433,285. Patented July 29, 1890.

Witnesses:
John G. Moon
Aly. Scott

Inventor:
A. J. Hanks
by Mann
attys

THE NORRIS PETERS CO., PHOTO-LITHO., WASHINGTON, D. C.

UNITED STATES PATENT OFFICE.

AUSTIN J. HANKS, OF WILMINGTON, OHIO.

VEHICLE-WHEEL.

SPECIFICATION forming part of Letters Patent No. 433,285, dated July 29, 1890.

Application filed November 9, 1889. Serial No. 329,828. (No model.)

*To all whom it may concern:*

Be it known that I, AUSTIN J. HANKS, of Wilmington, in the county of Clinton and State of Ohio, have invented a new and Improved Buggy-Wheel, of which the following is a full, clear, and exact description.

This invention relates to that class of wheels known as "suspension-wheels;" and the invention consists in the peculiar construction and arrangement of parts, as hereinafter fully described, and pointed out in the claims.

Reference is to be had to the accompanying drawings, forming a part of this specification, in which similar figures and letters of reference indicate corresponding parts in all the views.

Figure 1:
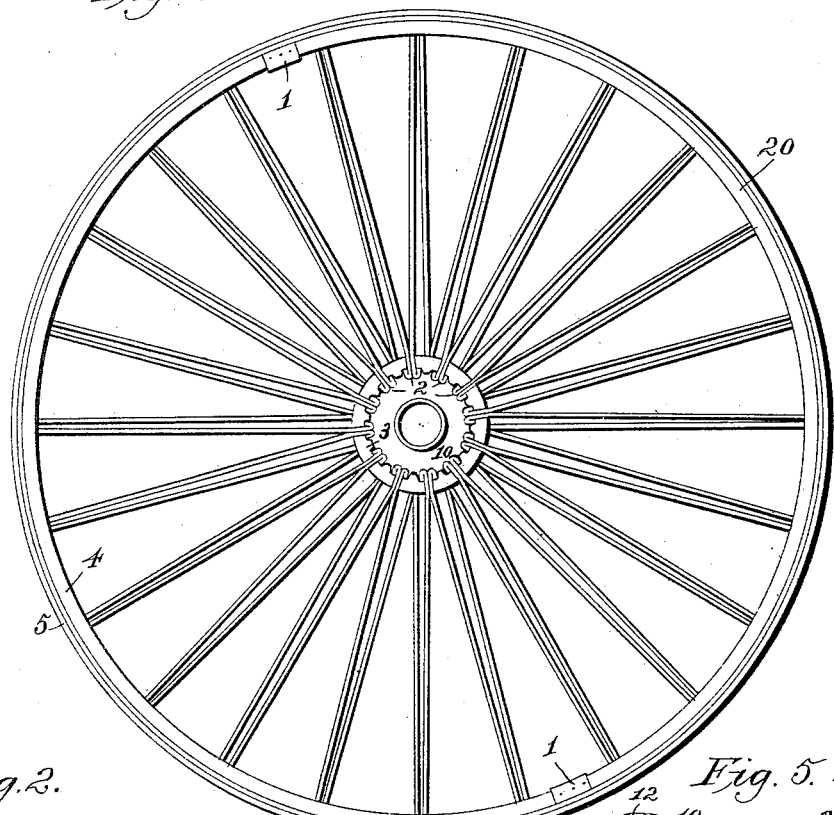
Figure 2:
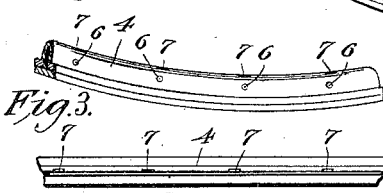
Figure 3:
Figure 4:
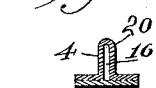
Figure 5:
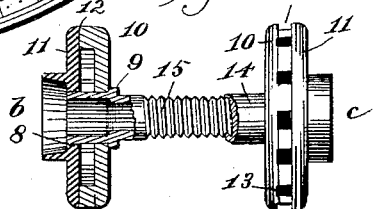
Figure 6:
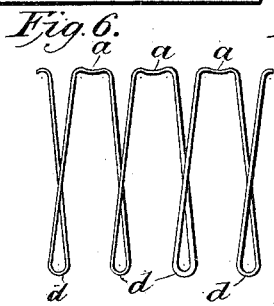
Figure 7:
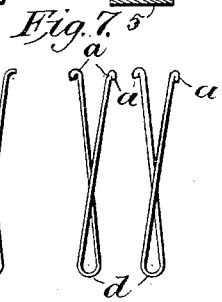
Figure 8:
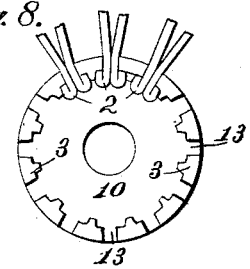

Figure 1 is a side view of one of the wheels with the outer cap removed. Fig. 2 is a view of a portion of the felly and tire of the wheel. Fig. 3 is a detail view representing the inner face of a portion of the felly. Fig. 4 is a cross-sectional view taken on line 4 of Figs. 2 and 3. Fig. 5 is a detail view of the hub of the wheel, the left-hand portion being shown in central section and the dust-case being broken away to disclose the construction of the box of the hub. Fig. 6 is a view of a portion of the wire from which the spokes are taken, said wire being represented as it appears when first taken from the former before separating at the wide loops $a$ in the drawings. Fig. 7 is a detail view of the spokes after the separation, showing the back-lap ends $a$ in Fig. 7 closed down; and Fig. 8 is a detail view of inner disk 10, exposing to careful observation the peculiar-shaped lug 3 and the manner the spokes 2 latch therein.

In order to clearly demonstrate my improvements in this application, I have found it necessary to produce a drawing closely approximating my United States Patent No. 384,759, dated June 19, 1888, and also to follow very closely in part the specification forming a part of the same, as my claims in this application are for improvements upon the above-named patent, as will be hereinafter fully described.

In constructing the wheel I provide, upon a machine specially constructed for that purpose, a felly 20, of light steel, of required dimensions, which is formed with a groove 16 in its outer face corresponding to that in cross-section Fig. 4 in the drawings, to fit neatly to the loop $d$ of the spokes, the felly then being bent to circular form and united, for instance, by means of a plate, as in Fig. 1 in the drawings. In the groove-rib I form apertures 7, and in the walls of the groove I form similar apertures, the purpose of which will be hereinafter explained. I then shrink a steel tire 5, as shown at cross-section, Fig. 4, upon the outer face of the steel felly in like manner as upon a wood felly, and when necessary fasten the two together with tire-bolts.

The hub of my improved form of wheel is made up of two pairs of disks, the inner disks 10 being formed with twelve lugs 3 thereon, each lug having a double-shouldered neck on the inner edge for the purpose shown at 2 in Fig. 3, and through the peripheral walls of the two disks 10, between the lugs 3, there are formed apertures 13, twelve of these apertures being preferably provided in each disk. The outer disks 11 are formed with integral bevel-flanges 12, which fit closely against and serve as supports to keep the spokes 2 securely in place. The one pair of disks 10 and 11 is internally but inversely threaded, and the disks are arranged to engage with a threaded sleeve 15, which is formed with a left-hand thread three-fourths its length, as illustrated, while upon the opposite enlarged end of the sleeve 15 is mounted a shoulder 9, against which the inner disk 10 is loosely mounted, the outer disk 11 being internally threaded and outer end 8 of sleeve 15 correspondingly threaded to tap the disk 11 firmly against disk 10. Between the two pairs of disks, when they are applied to the sleeve 15, there is fitted a dust-guard 14, which may be made of rubber or of any other proper material, the outer dust-guard of the wheels being formed upon the outer disks 11. The disks 10 are keyed to the sleeve 15, and thus held from turning. When a straight sleeve 15 is required, I may for convenience use the right and left hand thread, as in my former patent.

The spokes of the wheels are all formed from a single length of wire, which wire is made of annealed steel. This wire is bent upon a former, by which the single loops $d$ and the back-lap ends *a* are uniformly the same, the distance between the loops *d* and the back-lap ends *a* being equal to the length of the spokes. The spokes for any given number of wheels of the same size may be made at one time before the spoke is severed at wide loops *a* in Fig. 6, after which the back-lap ends *a* of the spokes may be formed down in any way most convenient—for instance, as shown in drawings at Fig. 7, in which it will be observed that each back-lap *a* forms one-half of a T-head 2. (Shown in Fig. 8.) The apertures 13 and projecting lugs 3 upon the inner faces of disks 10, as shown in the drawings, are so formed as to fit neatly to and around the back-lap enlargement or T-head 2 of the spoke ends and prevent any disarrangement or spreading of the back-laps *a* by use of the wheels.

In setting up the wheel, as illustrated in Fig. 1 of the drawings, I first insert in order within each aperture 7 of the felly 20 a spoke and secure said spokes in place by rivets or pins passed through the apertures 6, and through the loops *d* of the spokes I then bring into engagement with the apertures 13 of one of the disks 10 the tube 15, at this time being held by a proper center pin, the axis of which corresponds with that of the felly. Then after all of the apertures of one of the disks have been filled the outer disk 11 is connected to the tube 15, and the remaining spoke-heads 2 are brought into engagement with the lugs 3 within the apertures 13 of the other disk 10, and the outer disk 11 is placed loosely on, the tube 15 being turned at this time so as to force the two pairs of disks apart, and consequently to impart a proper tension to the spokes.

The back-lap T-head 2, and apertures 13 and projecting lugs 3, having on their inner edge a neck and double shoulder, as shown in Fig. 8 in the drawings, is in and of itself a positive and immovable fastening, as shown at Fig. 5, with outer dust-case 11 mounted thereon.

The wheel herein described is especially designed for any light vehicle, especially for buggies, and as the wheel is very strong and light and can be manufactured at a very small cost, at least one-third less than that of my former patent wheel, and is much stronger and extremely simple and easy to repair, it will be found to be an exceedingly desirable form of wheel.

Having thus fully described my invention, I claim as new and desire to secure by Letters Patent—

1. The herein-described wheel, consisting of the left-hand threaded sleeve 15, the disks 10 and 11, the disk 10 being provided with the lugs 3, having on their inner edge a neck and double shoulder, and the apertures 13 and the disks 11, with the bevel-flanges 12, the especial grooved and apertured felly 20, the spokes formed of a single piece of wire before being severed and provided with single loops *d* and back-lap heads *a*, forming a T-head in hub of two spoke-wires, pins for securing the spokes to the felly 20, having shrunk on its outer grooved face a metallic or steel tire 5, the hub sending two spoke-wires from each aperture to the felly, in like manner the felly sending two spoke-wires from each aperture to the hub, substantially as described.

2. In a wheel, the combination of the left-hand threaded sleeve 15 and loose shoulder-rest and threaded end 8, the disks 10, provided with apertures 13 and the lugs 3, having on inner edge neck and double rest for T-heads of spokes, the disks 11 provided with the flanges 12, and the dust-guard 14, fitted on the sleeve between the disks 10, substantially as herein shown and described.

AUSTIN J. HANKS.

Witnesses:
C. W. SWAIM,
J. H. McCARTNEY.